United States Patent                  (10) Patent No.:     US 7,831,400 B2
Stack et al.                            (45) Date of Patent:         Nov. 9, 2010

(54) DIAGNOSTIC APPARATUS AND METHODS FOR A CORIOLIS FLOW METER

(75) Inventors: Charles Paul Stack, Louisville, CO (US); Andrew Timothy Patten, Boulder, CO (US); Marc Allan Buttler, Estes Park, CO (US); Graeme Ralph Duffill, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 222 days.

(21) Appl. No.: 10/570,856

(22) PCT Filed: Sep. 29, 2003

(86) PCT No.: PCT/US03/30662

§ 371 (c)(1),
(2), (4) Date: Mar. 7, 2006

(87) PCT Pub. No.: WO2005/040734

PCT Pub. Date: May 6, 2005

(65) Prior Publication Data

US 2006/0265148 A1    Nov. 23, 2006

(51) Int. Cl.
*G06F 19/00* (2006.01)
(52) U.S. Cl. .............................. 702/59; 702/45; 702/50; 702/100; 73/32 A; 73/32 R; 73/861.18; 73/861.355; 73/861.357
(58) Field of Classification Search ................ 702/59, 702/45, 100, 50; 73/1.31, 1.34, 861.355–861.357, 73/32 R, 570, 861.18
See application file for complete search history.

(56) References Cited

U.S. PATENT DOCUMENTS

| 4,401,025 A |   | 8/1983  | Vogelhuber et al.          |
| RE31,450 E  | * | 11/1983 | Smith ............... 73/861.356 |
| 4,491,025 A | * | 1/1985  | Smith et al. ......... 73/861.355 |
| 4,996,871 A |   | 3/1991  | Romano                     |
| 5,115,683 A |   | 5/1992  | Pratt                      |
| 5,497,666 A | * | 3/1996  | Patten et al. ........ 73/861.355 |

(Continued)

FOREIGN PATENT DOCUMENTS

DE      4413239 A1     5/1995

(Continued)

*Primary Examiner*—Drew A Dunn
*Assistant Examiner*—Hien X Vo
(74) *Attorney, Agent, or Firm*—The Ollila Law Group LLC

(57) ABSTRACT

A system for calculating a flow rate of a flow meter using multiple modes is provided according to an embodiment of the invention. The system for calculating a flow rate of a flow meter using multiple modes comprises a means for calibrating the flow meter for a number of desired modes. The system for calculating a flow rate of a flow meter using multiple modes includes a means for determining a density of a material flowing through the flow meter associated with each mode. The system for calculating a flow rate of a flow meter using multiple modes further includes a means for determining the flow rate effect on density for each desired mode. The system for calculating a flow rate of a flow meter using multiple modes a means for calculating a flow rate based on the density and flow rate effect on density values for each desired mode.

20 Claims, 7 Drawing Sheets

U.S. PATENT DOCUMENTS

| | | |
|---|---|---|
| 5,687,100 A | 11/1997 | Buttler et al. |
| 5,804,742 A | 9/1998 | Rademacher-Dubbick |
| 5,827,979 A | 10/1998 | Schott et al. |
| 5,926,096 A | 7/1999 | Mattar et al. |
| 6,092,409 A * | 7/2000 | Patten et al. ............... 73/1.34 |
| 6,092,429 A * | 7/2000 | Cunningham et al. ... 73/861.356 |
| 6,199,022 B1 * | 3/2001 | Cunningham ............... 702/54 |
| 6,301,973 B1 | 10/2001 | Smith |
| 6,327,914 B1 * | 12/2001 | Dutton ................ 73/861.356 |
| 6,332,366 B1 | 12/2001 | Wray |
| 6,351,691 B1 * | 2/2002 | Mansfield ................ 700/282 |
| 6,360,175 B1 | 3/2002 | Cunningham et al. |
| 6,466,880 B2 * | 10/2002 | Cunningham et al. ......... 702/50 |
| 6,557,422 B1 | 5/2003 | Kolahi |
| 6,704,666 B2 * | 3/2004 | Normen ..................... 702/45 |
| 6,763,730 B1 * | 7/2004 | Wray .................. 73/861.356 |
| 2003/0055580 A1 | 3/2003 | Normen |
| 2003/0098069 A1 | 5/2003 | Sund |
| 2006/0265148 A1 | 11/2006 | Stack et al. |

FOREIGN PATENT DOCUMENTS

| | | |
|---|---|---|
| EP | 0702212 A2 | 3/1996 |
| EP | 0926473 A2 | 6/1999 |
| JP | 2000-241211 | 9/2000 |
| JP | 2002-62167 | 9/2003 |
| RU | 2164009 C2 | 3/2001 |
| RU | 2323419 C2 | 10/2007 |
| WO | WO-9321505 A | 10/1993 |
| WO | 9902945 A1 | 1/1999 |
| WO | WO-9939164 A1 | 8/1999 |
| WO | 0071979 A1 | 11/2000 |
| WO | WO 02/066934 A2 | 8/2002 |

\* cited by examiner

DIAGNOSTIC APPARATUS AND METHODS FOR A CORIOLIS FLOW METER

BACKGROUND OF THE INVENTION

1. Field of the Invention

The present invention relates to diagnostic apparatus and methods for a Coriolis flow meter.

2. Statement of the Problem

It is known to use Coriolis mass flow meters to measure mass flow and other information of materials flowing through a pipeline as disclosed in U.S. Pat. No. 4,491,025 issued to J. E. Smith, et al. of Jan. 1, 1985 and Re. 31,450 to J. E. Smith of Feb. 11, 1982. These flow meters have one or more flow tubes of different configurations. Each conduit configuration may be viewed as having a set of natural vibration modes including, for example, simple bending, torsional, radial and coupled modes. In a typical Coriolis mass flow measurement application, a conduit configuration is excited in one or more vibration modes as a material flows through the conduit, and motion of the conduit is measured at points spaced along the conduit.

The vibrational modes of the material filled systems are defined in part by the combined mass of the flow tubes and the material within the flow tubes. Material flows into the flow meter from a connected pipeline on the inlet side of the flow meter. The material is then directed through the flow tube or flow tubes and exits the flow meter to a pipeline connected on the outlet side.

A driver applies a force to the flow tube. The force causes the flow tube to oscillate. When there is no material flowing through the flow meter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Sensors are placed at different points on the flow tube to produce sinusoidal signals representative of the motion of the flow tube at the different points. A phase difference of the signals received from the sensors is calculated in units of time.

The phase difference between the sensor signals is proportional to the mass flow rate of the material flowing through the flow tube or flow tubes. The mass flow rate of the material is determined by multiplying the phase difference by a flow calibration factor. The flow calibration factor is determined by a calibration process. In the calibration process, a known fluid is passed through the flow tube at a given flow rate and the proportion between the phase difference and the flow rate is calculated.

One advantage of a Coriolis flow meter is that there are no moving components in the vibrating flow tube. The flow rate is determined by multiplying the phase difference between two points on the flow tube and the flow calibration factor. The phase difference is calculated from sinusoidal signals received from the sensors indicating the oscillation of two points on the flow tube. The flow calibration factor is proportional to the material and cross sectional properties of the flow tube. Therefore, the measurement of the phase difference and the flow calibration factor are not affected by wear of moving components in the flow meter.

However, it is a problem that material properties, cross sectional properties and the stiffness of a flow tube can change during operation of the Coriolis flow meter. The changes in the material properties, cross sectional properties and stiffness of the flow tube can be caused by erosion, corrosion, and coating of the flow tube by material flowing through the flow tube, changing pipeline mountings and temperature. One example of the change in cross-sectional properties of the flow tube is the change in the moment of inertia caused by corrosion of the flow tube. A second example of a change in the material and cross-sectional properties of the flow tube is an increase of the mass of the flow tube and a decrease in cross-sectional areas caused by coating of the flow tube by materials flowing through the tube. A change in the material properties, cross sectional properties and stiffness of the flow tube can change the flow and density calibration factors of the flow meter. If the flow calibration factor of the flow meter changes, flow rates that are calculated using the original flow calibration factor are inaccurate. Therefore, there is a need in the art for a system that detects a possible change in the material properties, cross sectional properties and/or stiffness of a flow tube indicating that the mass flow rates measured by the Coriolis flow meter may be inaccurate.

SUMMARY OF THE SOLUTION

The above and other problems are solved and an advance in the art is achieved through the provision of a system for validating the integrity of a Coriolis flow meter through the determination and comparison of various parameters, including mass flow and density. For example, mass flow and density are determined based on the mass flow effect on frequency, as disclosed in the U.S. Pat. No. 5,687,100 to Buttler et al. of Nov. 11, 1997.

A method for calculating a flow rate of a flow meter using multiple modes is provided according to an embodiment of the invention. The method for calculating a flow rate of a flow meter using multiple modes comprises calibrating the flow meter for a number of desired modes. The method for calculating a flow rate of a flow meter using multiple modes includes determining a density of a material flowing through the flow meter associated with each mode. The method for calculating a flow rate of a flow meter using multiple modes further includes determining the flow rate effect on density for each desired mode. The method for calculating a flow rate of a flow meter using multiple modes further includes calculating a flow rate based on the density and flow rate effect on density values for each desired mode.

A method for validating a flow meter using multiple modes is provided according to an embodiment of the invention. The method for validating a flow meter using multiple modes comprises the determination of a flow rate associated with each desired mode. The method for validating a flow meter using multiple modes includes comparing the flow rates and detecting an error condition responsive to the comparison.

A method for validating a flow meter using multiple modes is provided according to an embodiment of the invention. The method for validating a flow meter using multiple modes comprises determining a density of a material flow associated with each desired mode. The method for validating a flow meter using multiple modes includes comparing the density values associated with each mode and detecting an error condition responsive to the comparison.

A method for validating a flow meter using multiple modes is provided according to an embodiment of the invention. The method for validating a flow meter using multiple modes comprises calibrating the flow meter for a number of desired modes. The method for validating a flow meter using multiple modes includes determining a density of a material flowing through the flow meter associated with each mode. The method for validating a flow meter using multiple modes further includes determining the flow rate effect on density for each desired mode. The method for validating a flow meter using multiple modes further includes calculating a flow rate for each desired mode from the density and flow rate effect on density values for each desired mode. The method for validating a flow meter using multiple modes further includes comparing the flow rates and detecting an error condition responsive to the comparison.

A method for validating a flow meter using multiple modes is provided according to an embodiment of the invention. The method comprises calibrating the flow meter for a number of desired modes. After calibration, a flow rate effect on density for each desired mode is determined. Knowing the flow rate effect on density value for each desired mode a flow rate compensated density for each desired mode can then be calculated. A comparison of the density values is then made and an error condition responsive to the comparison is detected.

A method for determining a temperature of a material flow using multiple modes is provided according to an embodiment of the invention. The method comprises calibrating the flow meter for a number of desired modes to ascertain calibration constants. After calibration, a tube period is calculated for each of the desired modes. Using the calibration constants and tube periods for each mode, a temperature of a material flow can be determined.

A system for calculating a flow rate of a flow meter using multiple modes is provided according to an embodiment of the invention. The system for calculating a flow rate of a flow meter using multiple modes comprises a means for calibrating the flow meter for a number of desired modes. The system for calculating a flow rate of a flow meter using multiple modes includes a means for determining a density of a material flowing through the flow meter associated with each mode. The system for calculating a flow rate of a flow meter using multiple modes further includes a means for determining the flow rate effect on density for each desired mode. The system for calculating a flow rate of a flow meter using multiple modes further includes a means for calculating a flow rate based on the density and flow rate effect on density values for each desired mode.

A system for validating a flow meter using multiple modes is provided according to an embodiment of the invention. The system for validating a flow meter using multiple modes comprises a means for determining a flow rate associated with each desired mode. The system for validating a flow meter using multiple modes further comprises a means for comparing the flow rates determined for each mode and a means for means for detecting an error condition responsive to compared density values associated with each desired mode.

A system for validating a flow meter using multiple modes is provided according to an embodiment of the invention. The system for validating a flow meter using multiple modes comprises a means for determining a density of a material flow associated with each desired mode. The system for validating a flow meter using multiple modes includes a means for comparing the density values. The system for validating a flow meter using multiple modes further includes a means for detecting an error condition responsive to the compared density values.

A system for validating a flow meter using multiple modes is provided according to an embodiment of the invention. The system for validating a flow meter using multiple modes comprises a means for calibrating a flow meter for a number of desired modes. The system for validating a flow meter using multiple modes further comprises a means for determining a density of a material flowing through the flow meter associated with each mode. The system for validating a flow meter using multiple modes further comprises a means for determining the flow rate effect on density for each desired mode. The system for validating a flow meter using multiple modes further comprises a means for calculating a flow rate for each desired mode. The system for validating a flow meter using multiple modes further comprises a means for comparing the flow rates and a means for detecting an error condition responsive to the compared flow rate values.

A system for validating a flow meter using multiple modes is provided according to an embodiment of the invention. The system for validating a flow meter using multiple modes comprises a means for calibrating the flow meter for a number of desired modes. The system for validating a flow meter using multiple modes includes a means for determining a flow rate effect on density for each desired mode. The system for validating a flow meter using multiple modes further comprises a means for calculating a flow rate compensated density for each desired mode. The system for validating a flow meter using multiple modes further comprises a means for comparing the density values and a means for detecting an error condition responsive to the compared density values.

A system for determining a temperature of a material flow using multiple modes is provided according to an embodiment of the invention. The system for determining a temperature of a material flow using multiple modes comprises a means for calibrating the flow meter for a number of desired modes to ascertain calibration constants. The system for determining a temperature of a material flow using multiple modes includes a means for determining a tube period for each of the desired modes. The system for determining a temperature of a material flow using multiple modes further includes a means for determining a material flow temperature using the calibration constants and tube periods for each mode.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. The examples below have been expressed using two modes for brevity. It is to be understood that more than two modes can be used. Those skilled in the art will appreciate that the features described below can be combined in various ways to form multiple variations of the invention. As a result, the invention is not limited to the specific examples described below, but only by the claims and their equivalents.

Figure 1:
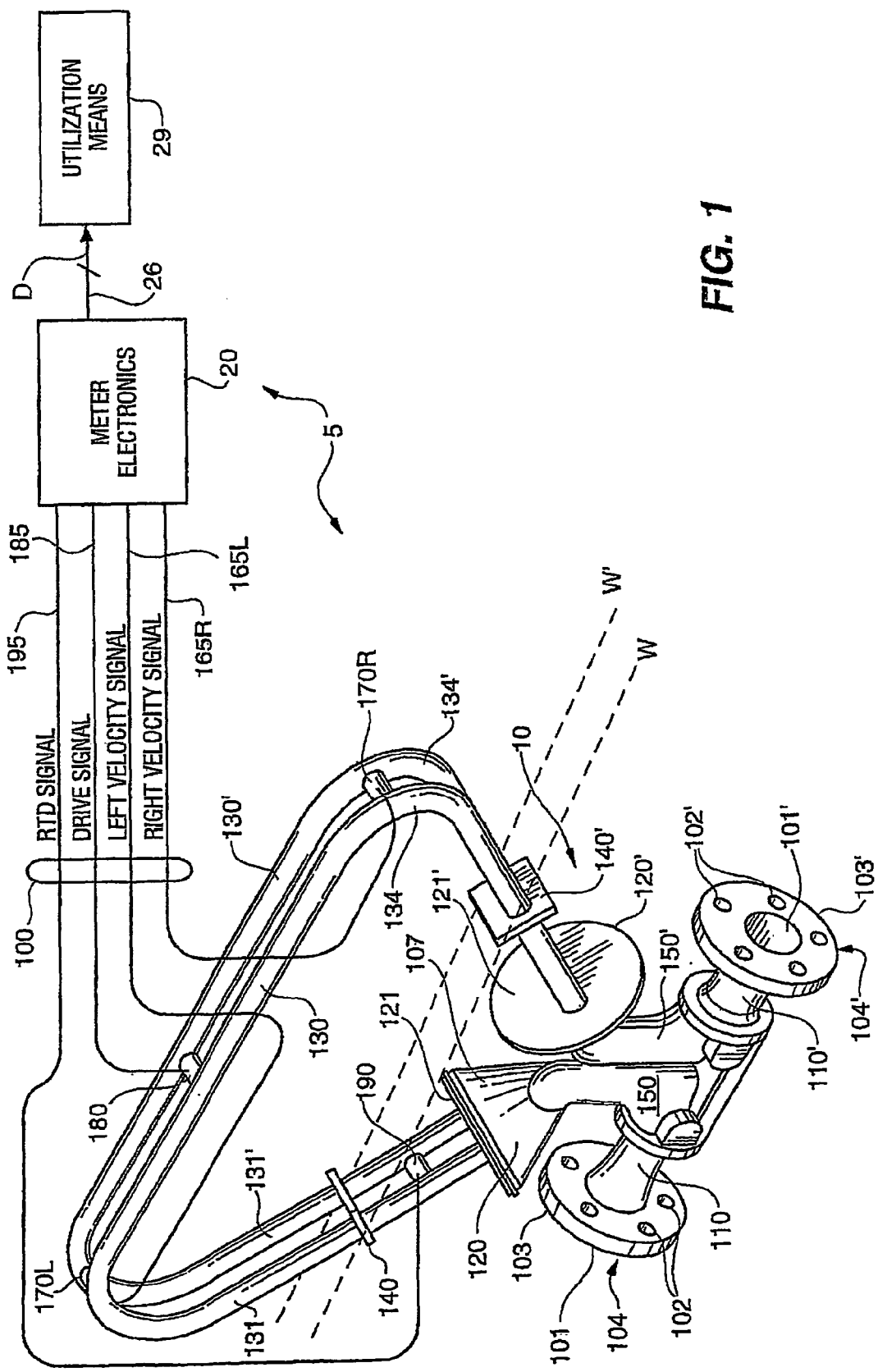
FIG. 1 illustrates a Coriolis flow meter in an example of the invention.

FIG. 1 shows a Coriolis flow meter 5 comprising a meter assembly 10 and meter electronics 20. Meter assembly 10 responds to mass flow rate and density of a process material. Meter electronics 20 is connected to meter assembly 10 via leads 100 to provide density, mass flow rate, and temperature information over path 26, as well as other information not relevant to the present invention. A Coriolis flow meter structure is described although it is apparent to those skilled in the art that the present invention could be practiced as a vibrating tube densitometer without the additional measurement capability provided by a Coriolis mass flow meter.

Meter assembly 10 includes a pair of manifolds 150 and 150', flanges 103 and 103' having flange necks 110 and 110', a pair of parallel flow tubes 130 and 130', drive mechanism 180, temperature sensor 190, and a pair of velocity sensors 170L and 170R. Flow tubes 130 and 130' have two essentially straight inlet legs 131 and 131' and outlet legs 134 and 134' which converge towards each other at flow tube mounting blocks 120 and 120'. Flow tubes 130 and 130' bend at two symmetrical locations along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to flow tube mounting blocks 120 and 120' and these blocks, in turn, are fixedly attached to manifolds 150 and 150'. This provides a continuous closed material path through Coriolis meter assembly 10.

When flanges 103 and 103', having holes 102 and 102' are connected, via inlet end 104 and outlet end 104' into a process line (not shown) which carries the process material that is being measured, material enters end 104 of the meter through an orifice 101 in flange 103 is conducted through manifold 150 to flow tube mounting block 120 having a surface 121. Within manifold 150 the material is divided and routed through flow tubes 130 and 130'. Upon exiting flow tubes 130 and 130', the process material is recombined in a single stream within manifold 150' and is thereafter routed to exit end 104' connected by flange 103' having bolt holes 102' to the process line (not shown).

Flow tubes 130 and 130' are selected and appropriately mounted to the flow tube mounting blocks 120 and 120' so as to have substantially the same mass distribution, moments of inertia and Young's modulus about bending axes W-W and W'-W', respectively. These bending axes go through brace bars 140 and 140'. Inasmuch as the Young's modulus of the flow tubes change with temperature, and this change affects the calculation of flow and density, resistive temperature detector (RTD) 190 is mounted to flow tube 130', to continuously measure the temperature of the flow tube. The temperature of the flow tube and hence the voltage appearing across the RTD for a given current passing therethrough is governed by the temperature of the material passing through the flow tube. The temperature dependent voltage appearing across the RTD is used in a well known method by meter electronics 20 to compensate for the change in elastic modulus of flow tubes 130 and 130' due to any changes in flow tube temperature. The RTD is connected to meter electronics 20 by lead 195.

Both flow tubes 130 and 130' are driven by driver 180 in opposite directions about their respective bending axes W and W' and at what is termed the first out-of-phase bending mode of the flow meter. This drive mechanism 180 may comprise any one of many well known arrangements, such as a magnet mounted to flow tube 130' and an opposing coil mounted to flow tube 130 and through which an alternating current is passed for vibrating both flow tubes. A suitable drive signal is applied by meter electronics 20, via lead 185, to drive mechanism 180.

Meter electronics 20 receives the RTD temperature signal on lead 195, and the left and right velocity signals appearing on leads 165L and 165R, respectively. Meter electronics 20 produces the drive signal appearing on lead 185 to drive element 180 and vibrate tubes 130 and 130'. Meter electronics 20 processes the left and right velocity signals and the RTD signal to compute the mass flow rate and the density of the material passing through meter assembly 10. This information, along with other information, is applied by meter electronics 20 over path 26 to utilization means 29.

Coriolis flow meter 5 is vibrated at its resonant frequency so as to enable flow meter 5 to measure mass and density. The mass measurement is based on the following equation:

$$\overset{o}{m} = FCF * [\Delta t - \Delta t_o] \qquad (1)$$

Where:

$$\overset{o}{m}$$

is the mass flow rate;

FCF is the flow calibration factor;

$\Delta t$ is the time delay; and $\Delta t_o$ is the time delay at zero flow.

The FCF term is proportional to the stiffness of the flow meter. Stiffness is the predominate parameter that affects the flow meter's performance. In other words, if the stiffness of the flow meter changes the meter's FCF will change. A change in the flow meters performance can be caused by corrosion, erosion and coating.

Equation (1) can be rewritten to reflect the stiffness:

$$\overset{o}{m} = G * (EI) * [\Delta t - \Delta t_o] \qquad (2)$$

Where:

G is a geometric constant associated with a particular sensor;

E is Young's Modulus; and

I is the moment of inertia.

The area moment of inertia, I, changes when the meter's flow tube changes. For example, if the tube corrodes reducing the wall thickness, the area moment of inertia is decreased.

Figure 2:
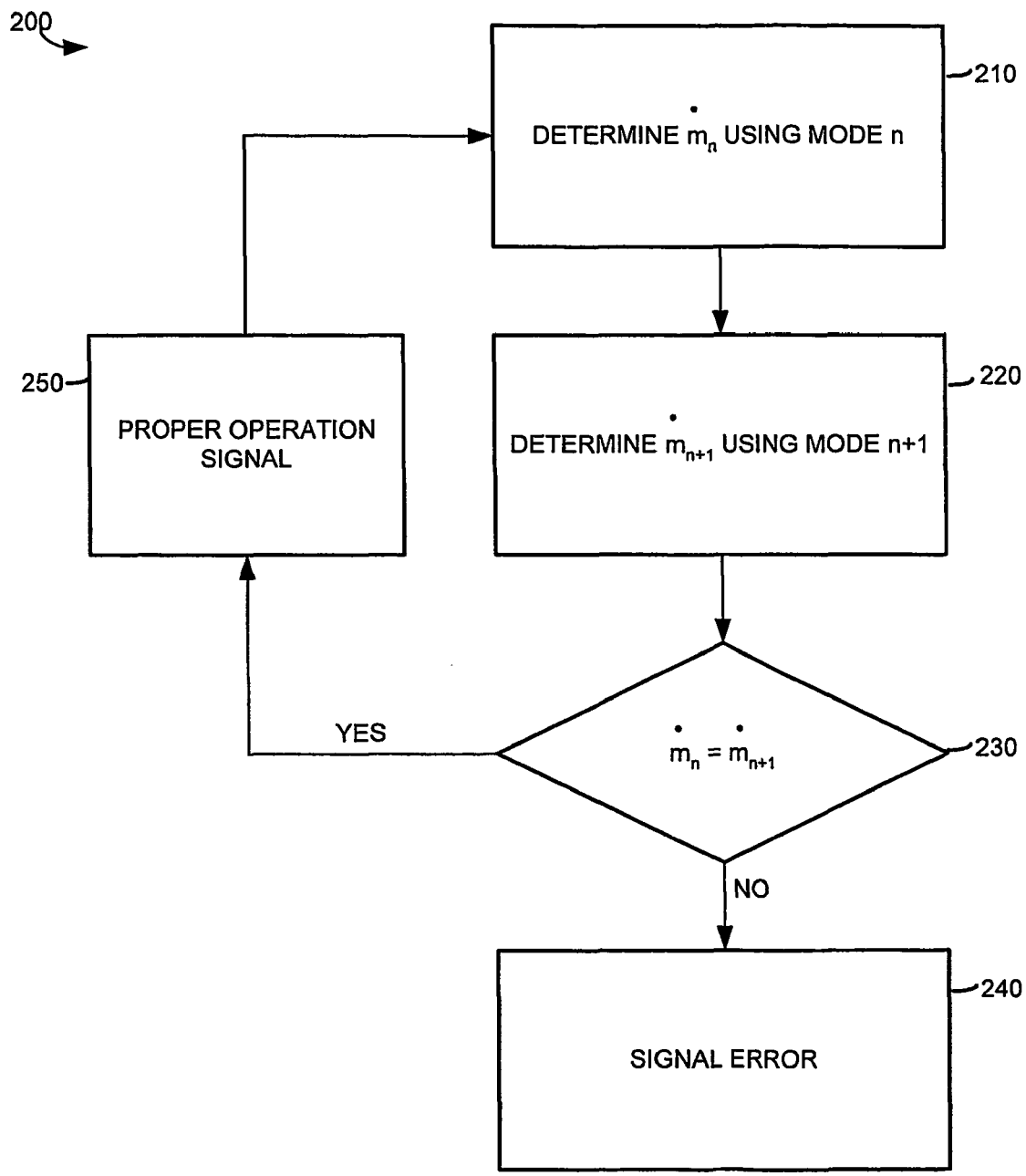
FIG. 2 illustrates a validation system in an example of the invention.

FIG. 2 shows a process 200 for detecting and differentiating flow meter structure changes from indicated changes in flow rate. Process 200 starts with the determination of mass flow rate, $$\overset{o}{m},$$

using multiple modes in steps 210 and 220 from the following equation:

$$\begin{pmatrix} \overset{o}{m}_1 \\ \overset{o}{m}_2 \\ \overset{o}{m}_n \end{pmatrix} = E \begin{pmatrix} G_1 & & \\ & G_2 & \\ & & G_n \end{pmatrix} \begin{pmatrix} I_1 & & \\ & I_2 & \\ & & I_n \end{pmatrix} \begin{pmatrix} \Delta t_1 & & \\ & \Delta t_2 & \\ & & \Delta t_n \end{pmatrix} - \begin{pmatrix} \Delta t_{1o} \\ \Delta t_{2o} \\ \Delta t_{no} \end{pmatrix} \quad (3)$$

When multiple modes are excited, either from flow noise or forced vibration, the vibration of the mode will couple with the mass flow passing through the flow tube causing a Coriolis response for each mode. The Coriolis response results in an associated Δt which is used to calculate a mass flow reading for each mode.

Step 230 compares the mass flow reading for each mode. The resulting mass flow rate must be the same for each mode. If the mass flow readings are equal, step 250 generates a "proper operation" signal and the process restarts at step 210. The "proper operation" signal can be in the form of a visible or audible signal to a user.

When a deviation occurs between the mass flow rates, which are outside of acceptable limits, an error signal is generated in step 240. The error signal generated in step 240 can cause various actions to occur. For instance, the error signal may cause the process to be shut down or may signal a visible or audible warning to an operator who then takes appropriate action.

The density measurements of Coriolis meter 5 are based on the following equation:

$$2\pi f = \frac{2\pi}{\tau} = \sqrt{\frac{k}{m}} \quad (4)$$

Where:
k is the stiffness of an assembly;
m is the mass of the assembly;
f is the frequency of oscillation; and
τ is the period of oscillation Equation (4) is the solution of the equation of motion for a single degree-of-freedom system. A Coriolis flow meter at zero flow is represented by an expansion of equation (4) yielding:

$$\frac{2\pi}{\tau} = \sqrt{\frac{EIG_\rho}{\rho_f A_f + \rho_t A_t}} \quad (5)$$

Where:
E is Young's modulus;
I is the cross-sectional moment of inertia;
$G_\rho$ is a geometric constant;
A is the cross-sectional area;
ρ is the density
f represents the fluid in the flow meter; and
t represents the material of the flow tube(s).

By rearranging terms, equation (5) can be re-written as:

$$\rho_f = C_1 \tau^2 - C_2 \quad (6)$$

Where:

$$C_1 = G_\rho \frac{EI}{4\pi^2 A_f}, \text{ and} \quad (7)$$

$$C_2 = \frac{\rho_t A_t}{A_f} \quad (8)$$

The geometric constant, $G_p$, accounts for geometric parameters such as tube length and shape. The constants, $C_1$ and $C_2$, are determined as part of the normal calibration process at zero flow on two different fluids.

Figure 3:
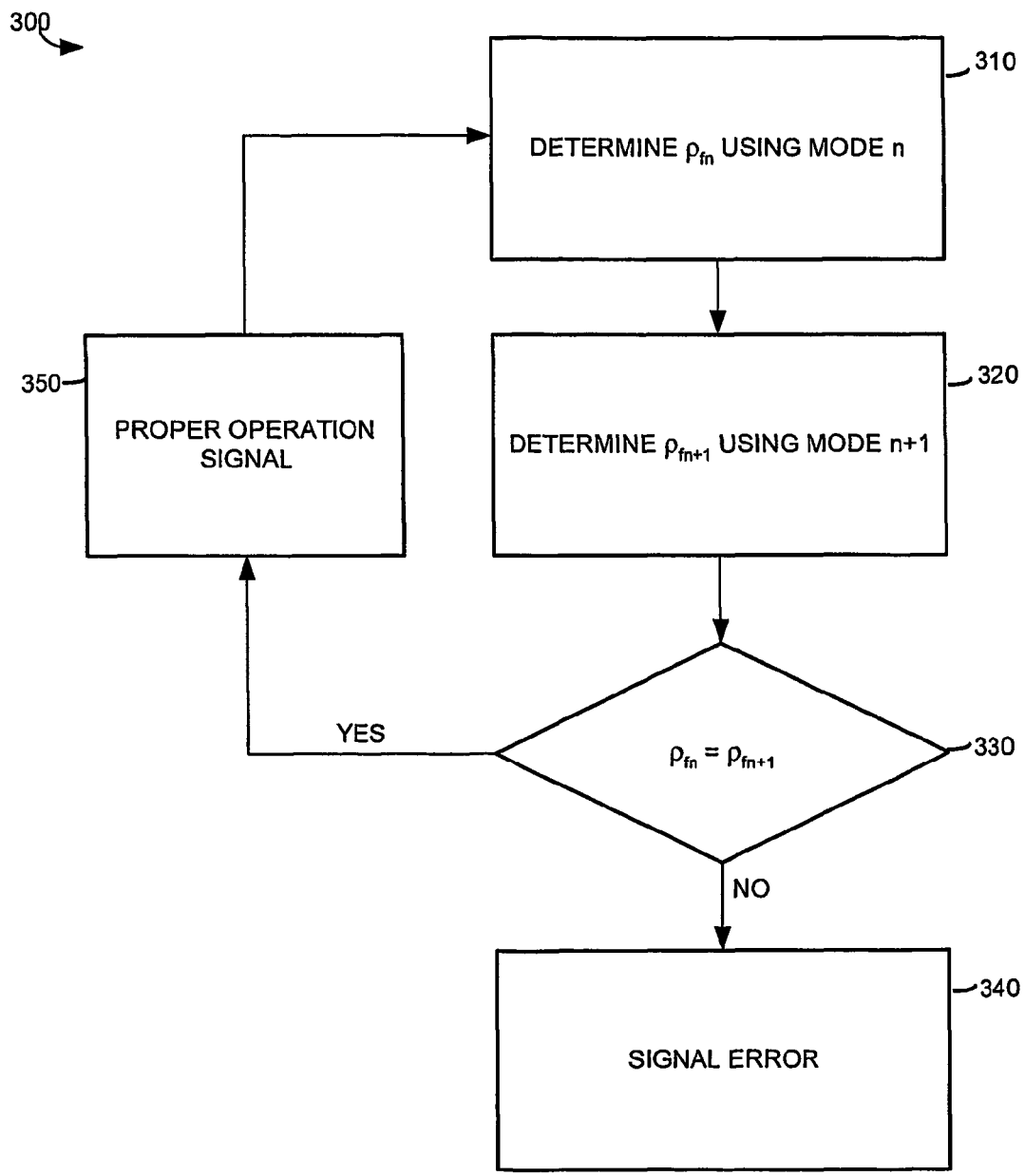
FIG. 3 illustrates a validation system in an example of the invention.

FIG. 3 shows a process 300 for detecting and differentiating flow meter structure changes from changes in indicated density. Process 300 starts with the determination of density, ρ, using multiple modes in steps 310 and 320. Multiple modes can be excited either from flow noise or forced vibration.

Step 330 compares the density reading for each mode. The resulting density reading must be the same for each mode. If the density readings are equal, step 350 generates a "proper operation" signal and the process restarts at step 310. The "proper operation" signal can be in the form of a visible or audible signal to a user.

When a deviation occurs between the density readings, which are outside of acceptable limits, an error signal is generated in step 340. The error signal generated in step 340 can cause various actions to occur. For instance, the error signal may cause the process to be shut down or may signal a visible or audible warning to an operator who then takes appropriate action.

In addition to the method described in equation (1) for determining mass flow, density can also be used to calculate mass flow. As described more fully in U.S. Pat. No. 5,687,100 to Buttler et al. of Nov. 11, 1997, a second-order flow effect on density term is added to equation (6) resulting in:

$$\rho_f = [C_1 \tau^2 - C_2] - \left(\overset{o}{m}\right)^2 FD \quad (9)$$

Where:

$\overset{o}{m}$ is the mass flow rate; and
FD is the flow effect on density constant.

The FD term is a constant for all flow rates and at all densities for a given mode shape, however, the FD term differs for each mode shape and tube geometry.

When flow meter 5 is driven in multiple modes or multiple modes are measured, multiple equations and multiple unknowns can be derived. For example, in the case of flow meter 5 being driven in two modes, the density equations are written as follows:

$$\rho_{fa} = [C_{1a} \tau_a^2 - C_{2a}] - \left(\overset{o}{m}_a\right)^2 FD_a \quad (10)$$

$$\rho_{fb} = [C_{1b}\tau_b^2 - C_{2b}] - (\overset{\circ}{m}_b)^2 FD_b \qquad (11)$$

Where:
a is a first mode shape;
b is a second mode shape;
$C_{1a}\tau_a^2 - C_{2a}$ is $p_a$, the true density using mode a;
$C_{1b}\tau_b^2 - C_{2b}$ is $P_b$, the true density using mode b;
$\rho_{fa}$ is the true density corrected for the flow effect on density measurement; and
$\rho_{fb}$ is the true density corrected for the flow effect on density measurement.

Equations (10) and (11) are two independent density readings, at zero flow, corrected for the flow effect, using two modes. Since $\rho_{fa}$ and $\rho_{fb}$ are equal, equations (10) and (11) can be combined to form:

$$[C_{1a}\tau_a^2 - C_{2a}] - (\overset{\circ}{m}_a)^2 FD_a = [C_{1b}\tau_b^2 - C_{2b}] - (\overset{\circ}{m}_b)^2 FD_b \qquad (12)$$

For a single flow path, $m_a = m_b$, resulting in a solution for mass flow as follows:

$$\overset{\circ}{m}_{fd} = \sqrt{\frac{\rho_a - \rho_b}{FD_a - FD_b}} \qquad (13)$$

Figure 4:
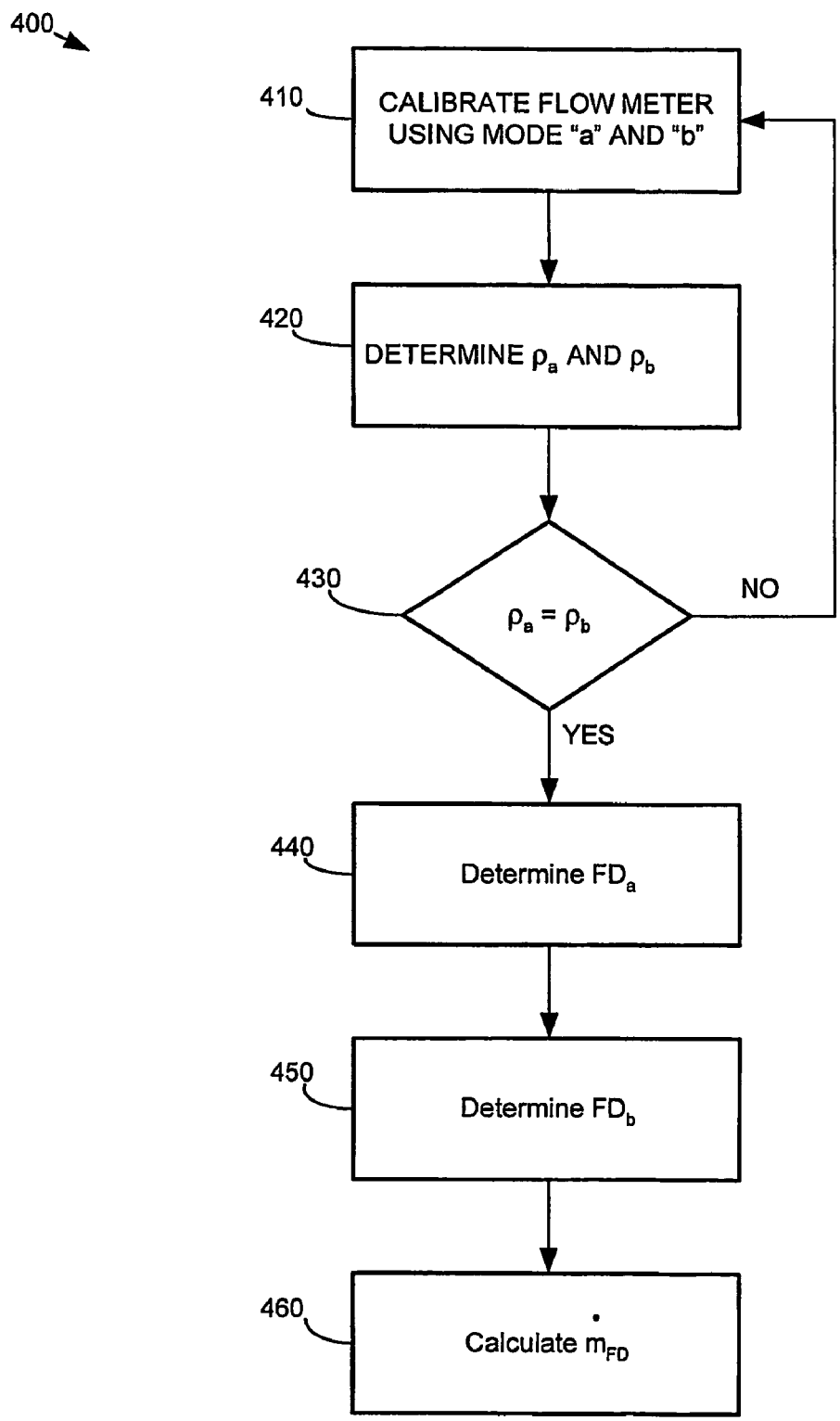
FIG. 4 illustrates a process for determining flow rate in an example of the invention.

FIG. 4 shows a process 400 for determining mass flow based on density. Process 400 starts with calibration of flow meter 5 using modes "a" and "b" in step 410. The calibration process establishes constants $C_{1a}$ and $C_{2a}$ and $C_{1b}$ and $C_{2b}$ using two different fluid densities, i.e. air and water.

Step 420 determines the density values, $\rho_a$ and $\rho_b$, from equation (6) above. Step 430 compares $\rho_a$ and $\rho_b$ to determine if the density values agree. If the density values do not agree calibration must be performed again in step 410. If the density values agree, steps 440 and 450 determine the associated FD values for modes "a" and "b". Once the FD values are determined, mass flow is calculated in step 460 using equation (13).

Figure 5:
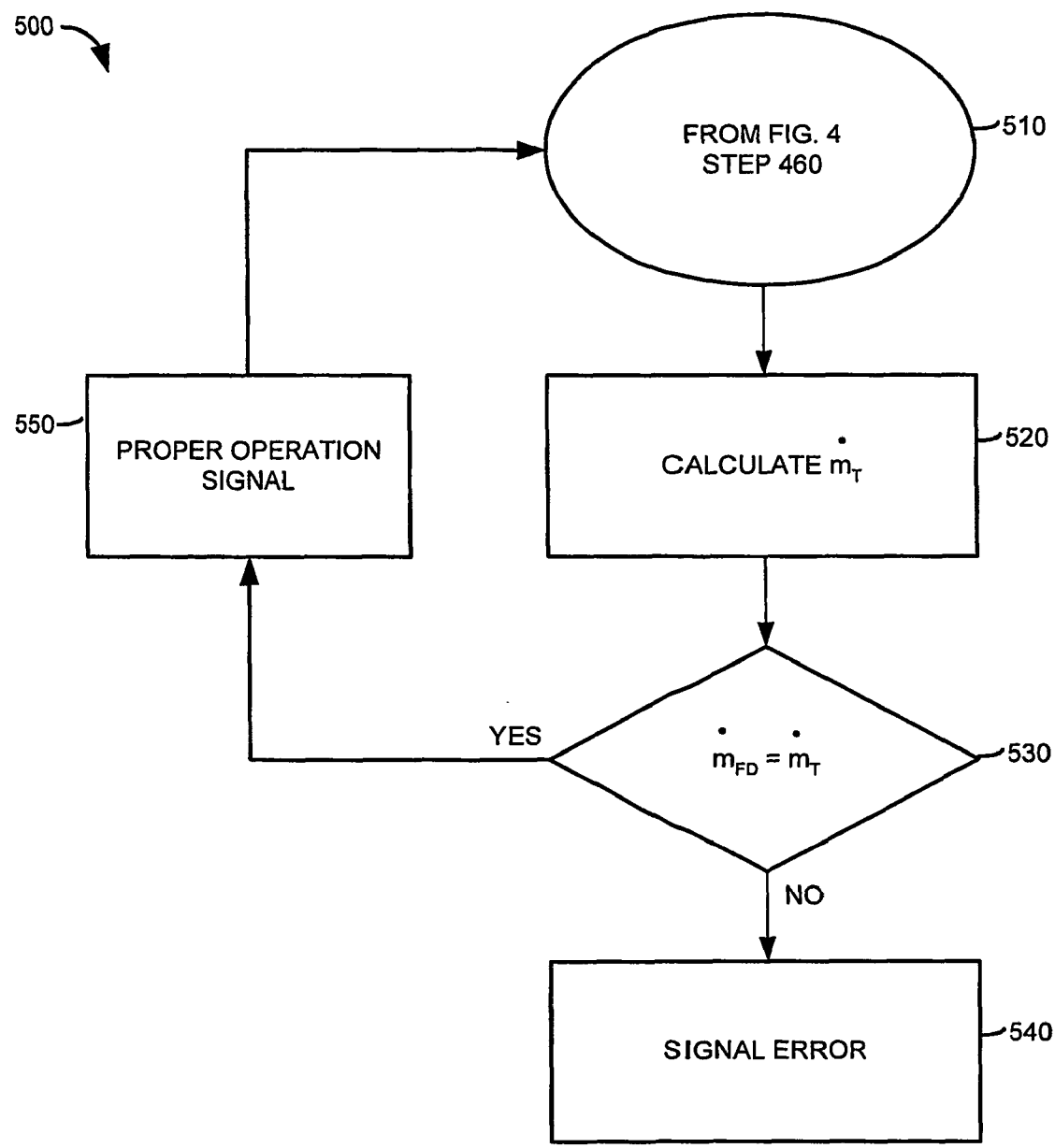
FIG. 5 illustrates a validation system in an example of the invention.

The $$\overset{\circ}{m}_{fd}$$

value determined above can also be used to determine when changes have occurred in the flow meter. FIG. 5 shows a process 500 for detecting and differentiating flow meter structure changes from indicated changes in flow rate. Process 500 starts with the determination of mass flow rate, $$\overset{\circ}{m}_{fd},$$

from step 460 of FIG. 4 in step 510.

Step 520 calculates a traditional mass flow rate, $$\overset{\circ}{m}_T,$$

from equation (1) and compares $$\overset{\circ}{m}_{fd} \text{ and } \overset{\circ}{m}_T$$

in step 530. If the mass flow readings are equal, step 550 generates a "proper operation" signal and the process restarts at step 510. The "proper operation" signal can be in the form of a visible or audible signal to a user.

When a deviation occurs between the mass flow readings, which are outside of acceptable limits, an error signal is generated in step 540. The error signal generated in step 540 can cause various actions to occur. For instance, the error signal may cause the process to be shut down or may signal a visible or audible warning to an operator who then takes appropriate action.

Figure 6:
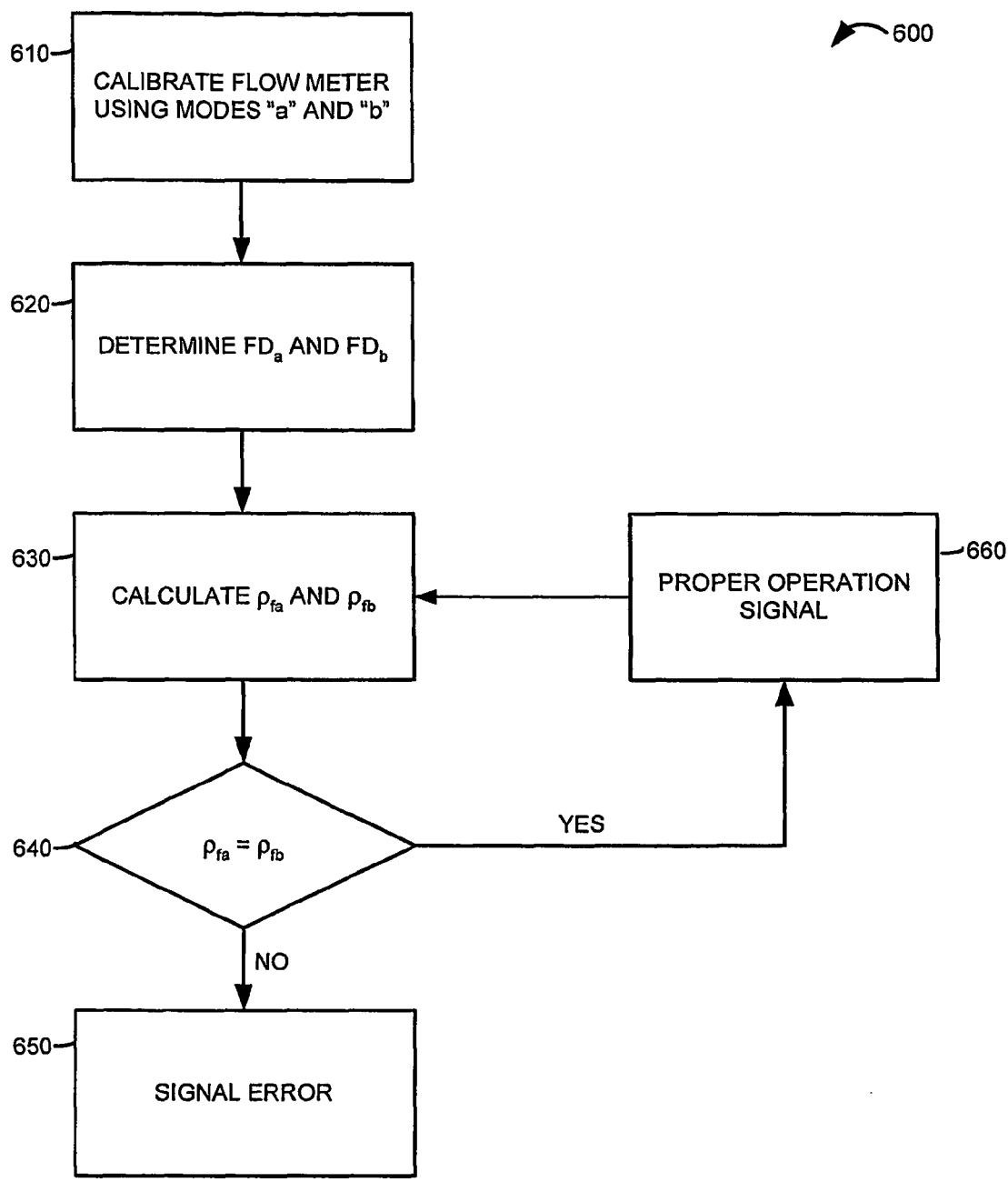
FIG. 6 illustrates a validation system in an example of the invention.

The $\rho_{fa}$ and $\rho_{fb}$ values determined above can also be used to determine when changes have occurred in the flow meter. FIG. 6 shows a process 600 for detecting and differentiating flow meter structure changes from indicated changes in density corrected for the flow rate effect.

Process 600 starts with calibration of flow meter 5 using modes "a" and "b" in step 610. The calibration process establishes constants $C_{1a}$ and $C_{2a}$ and $C_{1b}$ and $C_{2b}$ using two different fluid densities, i.e. air and water. It is to be understood that multiple modes can be used and that the use of two modes in this example are for illustrative purposes only.

Step 620 determines the associated FD values for modes "a" and "b". Once the FD values are determined, $\rho_{fa}$ and $\rho_{fb}$ are calculated in step 630 using equations (10) and (11).

Step 640 compares the density readings, $\rho_{fa}$ and $\rho_{fb}$. The density readings must be the same for each mode. If the density readings are equal, step 660 generates a "proper operation" signal and the process restarts at step 620. The "proper operation" signal can be in the form of a visible or audible signal to a user.

When a deviation occurs between the density readings, which are outside of acceptable limits, an error signal is generated in step 650. The error signal generated in step 650 can cause various actions to occur. For instance, the error signal may cause the process to be shut down or may signal a visible or audible warning to an operator who then takes appropriate action.

Multiple mode density determination can also be used to ascertain the temperature of the material flow. Density, as a function of temperature, is expressed from the following:

$$\rho_n = C_{1a} \ast \tau^2 (1 - 0.0004T) + C_{2n} \qquad (14)$$

Where:
$\rho_n$ is a temperature compensated density using mode n;
C1n is a first constant using mode n;
C2n is a second constant using mode n;
$\tau$ is the tube period; and
T is the temperature of the material flow.

Using multiple modes, the temperature of the material flow can be ascertained using equation (14). For example, using two modes of operation, equation (14) can be expressed as two equations:

$$\rho_1 = C_{11} * \tau^2(1-0.0004T) + c_{21} \quad (15)$$

$$\rho_2 = C_{12} * \tau^2(1-0.0004T) + C_{22} \quad (16)$$

Since $\rho_1$ and $\rho_2$ are equal, equations (15) and (16) written as:

$$(1 - 0.0004T) = \frac{C_{22} - C_{21}}{C_{11}\tau_2^2 - C_{12}\tau_2^2} \quad (17)$$

Solving for T yields:

$$T = \left(1 - \frac{C_{22} - C_{21}}{C_{11}\tau_1^2 - C_{12}\tau_2^2}\right)\frac{1}{0.0004} \quad (18)$$

Figure 7:
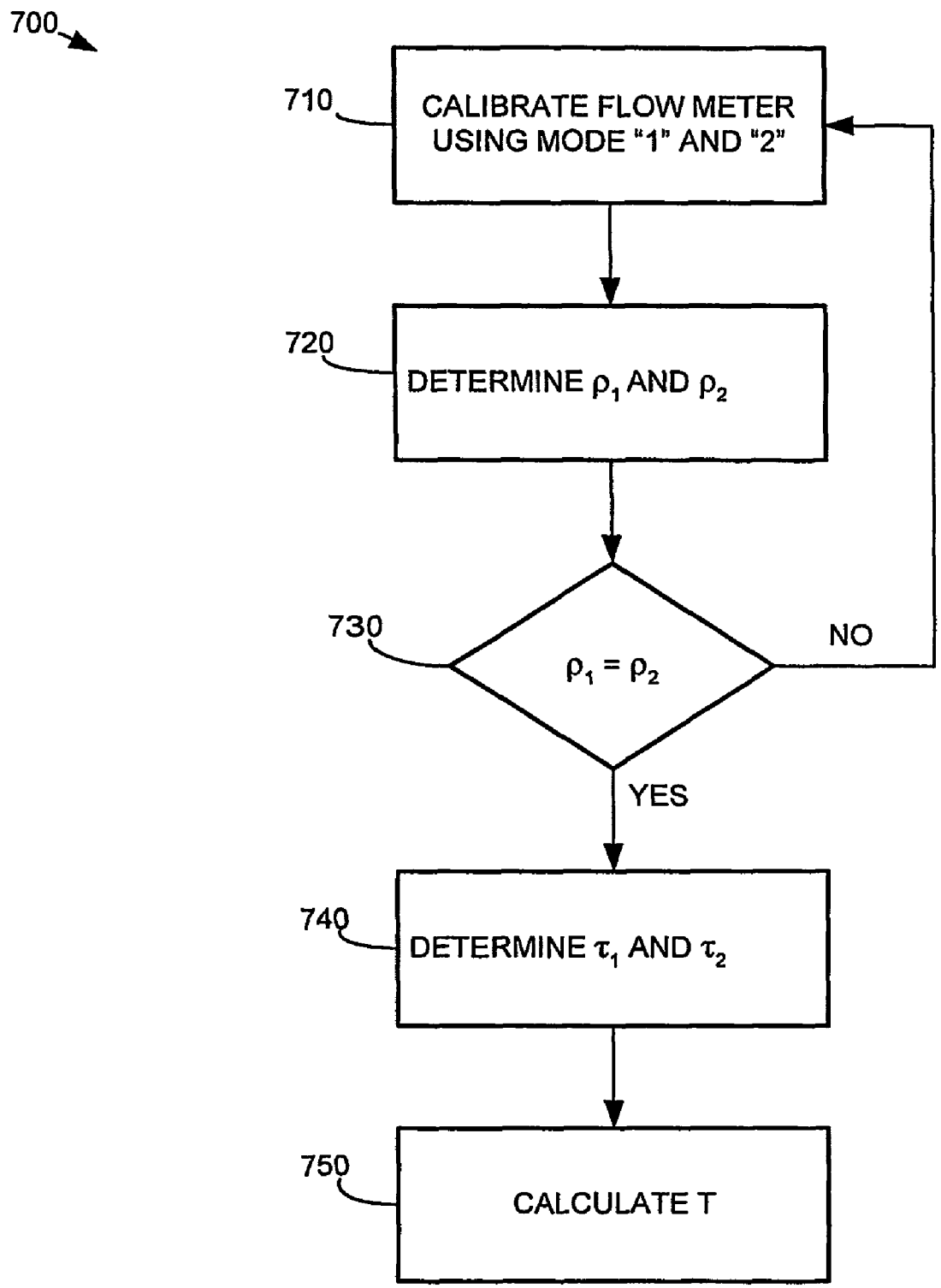
FIG. 7 illustrates a process for temperature in an example of the invention.

FIG. 7 shows a process 700 for ascertaining material flow temperature based on multiple mode density determination. Process 700 starts with calibration of flow meter 5 using modes "1" and "2" in step 710. The calibration process establishes constants $C_{11}$ and $C_{21}$, and $C_{12}$ and $C_{22}$ using two different fluid densities, i.e. air and water.

Step 720 determines the density values, $\rho_1$ and $\rho_2$, from equation (15) and (16) above. Step 730 compares $\rho_1$ and $\rho_2$ to determine if the density values agree. If the density values do not agree calibration must be performed again in step 710. If the density values agree, step 740 determines the associated tube period values for modes "1" and "2". Once the tube period values are determined, temperature is calculated in step 750 using equation (18).

We claim:

1. A method for validating a flow meter using multiple vibration modes, comprising the steps of:
    receiving the multiple vibration modes in a meter electronics of the flow meter;
    determining a flow rate associated with each vibration mode of the multiple vibration modes;
    comparing the flow rates;
    detecting an error condition if the flow rates are substantially different, with the error condition detecting flow meter structure changes, and detecting proper operation if the flow rates are substantially equal.

2. The method of claim 1 further comprising the step of signaling the error condition.

3. A method for validating a flow meter using multiple vibration modes, comprising the steps of:
    receiving the multiple vibration modes in a meter electronics of the flow meter;
    determining a density of a material flowing through the flow meter associated with each vibration mode of the multiple vibration modes;
    comparing the density values
    detecting an error condition if the density values are substantially different, with the error condition detecting flow meter structure changes, and detecting proper operation if the density values are substantially equal.

4. The method of claim 3 further comprising the step of signaling the error condition.

5. A method for calculating a flow rate of a flow meter using multiple vibration modes, comprising the steps of:
    receiving the multiple vibration modes in a meter electronics of the flow meter;
    calibrating the flow meter for each desired vibration mode;
    determining density of a material flowing through the flow meter associated with each desired vibration mode;
    determining a flow rate effect on density value for each desired vibration mode; and
    calculating flow rate using the density values and flow rate effect on density values for each desired vibration mode.

6. A method for validating a flow meter using multiple vibration modes, comprising the steps of:
    calibrating the flow meter for each desired vibration mode;
    receiving the multiple vibration modes in a meter electronics of the flow meter;
    determining density of a material flowing through the flow meter associated with each desired vibration mode;
    determining flow rate effect on density value for each desired vibration mode; and
    calculating a first flow rate using the density values and flow rate effect on density values for each desired vibration mode;
    calculating a second flow rate using a phase or time delay;
    comparing the first and second flow rates; and
    detecting an error condition responsive to comparing the first and the second flow rates.

7. The method of claim 6 further comprising the step of signaling the error condition.

8. A method for validating a flow meter using multiple vibration modes, comprising the steps of:
    calibrating the flow meter for each desired vibration mode;
    receiving the multiple vibration modes in a meter electronics of the flow meter;
    determining a flow rate effect on density value for each desired vibration mode; and
    determining a flow rate compensated density of a material flowing through the flow meter for each desired vibration mode, wherein the compensating is based on the flow rate effect on density values;
    comparing the flow rate compensated density values associated with each desired vibration mode; and
    detecting an error condition responsive to comparing the flow rate compensated density values associated with each desired vibration mode.

9. The method of claim 8 further comprising the step of signaling the error condition.

10. A method for calculating a temperature of a material flow using multiple vibration modes, comprising the steps of:
    receiving the multiple vibration modes in a meter electronics of the flow meter;
    calibrating the flow meter for each desired vibration mode to determine calibration constants;
    determining a tube period associated with each desired vibration mode; and
    calculating the temperature of the material flow using the calibration constants and tube period for each desired vibration mode.

11. A system for validating a flow meter using multiple vibration modes, comprising:
    means for determining a flow rate associated with each vibration mode of the multiple vibration modes;
    means for comparing the flow rates; and
    means for detecting an error condition if the flow rates are substantially different, with the error condition detecting flow meter structure changes, and detecting proper operation if the flow rates are substantially equal.

12. The system of claim 11 further comprising means for signaling the error condition.

13. A system for validating a flow meter using multiple vibration modes, comprising:

means for determining a density of a material flowing through the flow meter associated with each vibration mode of the multiple vibration modes;

means for comparing the density values associated with each desired vibration mode; and means for detecting an error condition if the density values are substantially different, with the error condition detecting flow meter structure changes, and detecting proper operation if the density values are substantially equal.

14. The system of claim 13 further comprising means for signaling the error condition.

15. A system for calculating a flow rate of a flow meter using multiple vibration modes, comprising:

means for calibrating the flow meter for each desired vibration mode;

means for determining density of a material flowing through the flow meter associated with each desired vibration mode;

means for determining flow rate effect on density value for each desired vibration mode; and means for calculating flow rate using the density values and flow rate effect on density values for each desired vibration mode.

16. A system for validating a flow meter using multiple vibration modes, comprising:

means for calibrating the flow meter for each desired vibration mode;

means for determining density of a material flowing through the flow meter associated with each desired vibration mode;

means for determining flow rate effect on density value for each desired vibration mode; and means for calculating a first flow rate using the density values and flow rate effect on density values for each desired vibration mode;

means for calculating a second flow rate using a phase or time delay;

means for comparing the first and second flow rates; and means for detecting an error condition responsive to comparing the first and the second flow rates.

17. The system of claim 16 further comprising means for signaling the error condition.

18. A system for validating a flow meter using multiple vibration modes, comprising the steps of:

means for calibrating the flow meter for each desired vibration mode;

means for determining a flow rate effect on density value for each desired vibration mode;

means for determining a flow rate compensated density of a material flowing through the flow meter for each desired vibration mode, wherein the compensating is based on the flow rate effect on density values;

means for comparing the flow rate compensated density values associated with each desired vibration mode; and means for detecting an error condition responsive to comparing the flow rate compensated density values associated with each desired vibration mode.

19. The system of claim 18 further comprising means for signaling the error condition.

20. A system for calculating a temperature of a material flow using multiple vibration modes, comprising the steps of:

means for calibrating the flow meter for each desired vibration mode to determine calibration constants;

means for determining a tube period associated with each desired vibration mode; and means for calculating the temperature of the material flow using the calibration constants and tube periods for each desired vibration mode.

* * * * *

UNITED STATES PATENT AND TRADEMARK OFFICE
CERTIFICATE OF CORRECTION

PATENT NO. : 7,831,400 B2
APPLICATION NO. : 10/570856
DATED : November 9, 2010
INVENTOR(S) : Charles Paul Stack et al.

It is certified that error appears in the above-identified patent and that said Letters Patent is hereby corrected as shown below:

In the Specifications:

Column 9, line 11, replace "is $\rho_a$" with -- is $\rho_a$, --; line 12, replace "is $P_b$" with -- is $\rho_b$, --.

Column 10, Equation 14, that portion of the formula reading "$\rho_n = C_{1a}$" should read -- $\rho_n = C_{1n}$ --.

Signed and Sealed this

Eighth Day of February, 2011

David J. Kappos
*Director of the United States Patent and Trademark Office*